US009965800B1

(12) United States Patent
Pitstick et al.

(10) Patent No.: US 9,965,800 B1
(45) Date of Patent: May 8, 2018

(54) DISPLAY OF AN ELECTRONIC REPRESENTATION OF A PHYSICAL OBJECT IN A VIRTUAL ENVIRONMENT

(71) Applicant: Amazon Technologies, Inc., Reno, NV (US)

(72) Inventors: Christopher Pitstick, Seattle, WA (US); Daniel Paul Kirschner, Seattle, WA (US); Pratik Prakash Shah, Seattle, WA (US); Ganesh Kumar Gella, Bellevue, WA (US); Gregory Paul Niejadlik, Seattle, WA (US); Sara Elisabeth Borowski, Seattle, WA (US); Jessica Lauren Fracassini, Seattle, WA (US); Jason Douglas Trichel, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 681 days.

(21) Appl. No.: 14/023,329

(22) Filed: Sep. 10, 2013

Related U.S. Application Data

(60) Provisional application No. 61/845,898, filed on Jul. 12, 2013.

(51) Int. Cl.
*G06Q 30/00* (2012.01)
*G06Q 30/06* (2012.01)

(52) U.S. Cl.
CPC ................ *G06Q 30/0643* (2013.01)

(58) Field of Classification Search
CPC ..... G06F 17/50; G06F 3/04842; G06Q 30/02; G06Q 30/0209; G06Q 30/0212;
(Continued)

(56) References Cited

U.S. PATENT DOCUMENTS 7,062,722 B1 * 6/2006 Carlin .................... G06T 15/10
715/781
7,277,572 B2 * 10/2007 MacInnes ........... G06F 17/5004
345/419

(Continued)

FOREIGN PATENT DOCUMENTS

WO   WO 2005/029308   * 3/2005   ............. G06F 3/033
WO   WO 2009/158310   * 12/2009  ............. G06F 3/048

OTHER PUBLICATIONS

Cant et al.: Methods for Automated Object Placement in Virtual Scenes, 2009, UKSim 2009: 11th International Conference on Computer Modelling and Simulation, pp. 431-436 (Year: 2009).*
Yu et al.: Make It Home: Automatic Optimization of Furniture Arrangement, Aug. 2011, pp. 1-12. (Year: 2011).*

*Primary Examiner* — Bijendra K Shrestha
(74) *Attorney, Agent, or Firm* — Thorpe North & Western, LLP.

(57) ABSTRACT

The technology may provide display of an electronic representation of physical art in a virtual environment so that a customer may visualize how the physical art would appear in a physical environment. Based on a characteristic of the physical art, a virtual environment in which to display an electronic representation of the physical art may be selected. The electronic representation of the physical art may then be included in the virtual environment for display to a customer. The customer may then electronically purchase the physical art via the virtual environment.

24 Claims, 13 Drawing Sheets

(58) Field of Classification Search
CPC ........... G06Q 30/0226; G06Q 30/0236; G06Q 30/0239; G06Q 30/0252; G06Q 30/06; G06Q 30/0643; G06Q 30/08; G06T 19/006

See application file for complete search history.

(56) References Cited

U.S. PATENT DOCUMENTS

| | | | | |
|---|---|---|---|---|
| 7,457,730 | B2* | 11/2008 | Degnan | G06T 11/60 52/235 |
| 8,081,158 | B2* | 12/2011 | Harris | G06Q 30/02 345/156 |
| 8,280,700 | B2* | 10/2012 | Pendyala | G06F 17/5004 434/79 |
| 8,668,498 | B2* | 3/2014 | Calman | G09B 25/04 434/72 |
| 8,881,017 | B2* | 11/2014 | Gil | G06Q 30/0251 715/703 |
| 2001/0034668 | A1* | 10/2001 | Whitworth | G06Q 30/06 705/26.3 |
| 2007/0124215 | A1* | 5/2007 | Simmons, Jr. | G06Q 30/0603 705/27.2 |
| 2012/0117502 | A1* | 5/2012 | Nguyen | G06K 9/0057 715/769 |
| 2014/0108109 | A1* | 4/2014 | Glickfield | G09F 23/06 705/14.4 |
| 2016/0132963 | A1* | 5/2016 | Lin-Hendel | G06F 3/04815 705/27.2 |

* cited by examiner

DISPLAY OF AN ELECTRONIC REPRESENTATION OF A PHYSICAL OBJECT IN A VIRTUAL ENVIRONMENT

RELATED APPLICATION

This application claims the benefit of U.S. Provisional Patent Application No. 61/845,898, filed Jul. 12, 2013, the content of which is incorporated herein by reference in its entirety.

BACKGROUND

Electronic retail stores have a number of advantages over brick-and-mortar stores. For example, electronic retail stores may not be limited to specific hours of operation or geography. As a result, electronic retail stores may enable consumers to shop whenever and wherever is convenient to the consumer. Additionally, electronic retail stores may provide a wider selection of items because electronic stores may not be constrained by the availability of a physical show room floor. Also, prices of items may be lower from electronic retailers that do not maintain a physical or brick-and-mortar store presence.

Despite various advantages provided by electronic retail stores, many customers may still feel some trepidation about purchasing certain types of items through an electronic store. For example, when purchasing art, a customer may be unsure how the art will look or fit in a given environment. Brick and mortar stores or art galleries may allow users to physically view the art in a physical display environment to assist customers in making a purchase.

DETAILED DESCRIPTION

Figure 1:
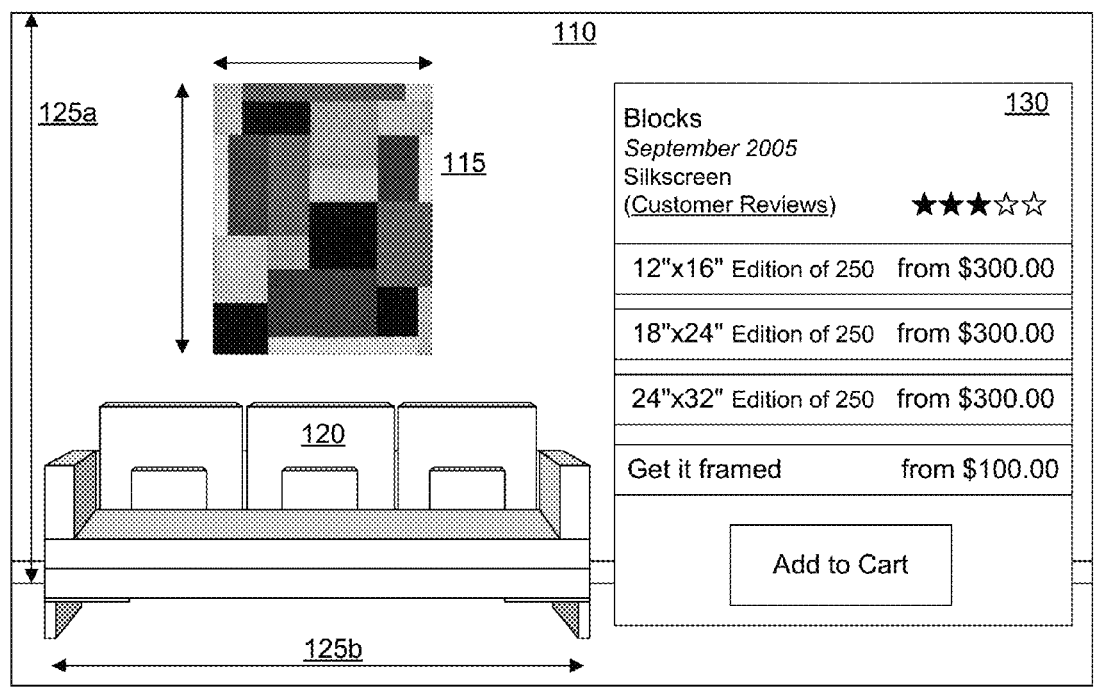
FIG. 1 is an illustration of a user interface including a display of art in a virtual environment, and further including an option to purchase a physical copy of the displayed art in accordance with an example of the present technology.

The technology may provide a display of a digital or electronic representation of physical art in a virtual environment so that a customer may visualize how the physical art would appear in a physical environment. The customer may then electronically purchase the physical art via the virtual environment. For example, the customer may make a request via a client computing device to view an electronic representation of physical art in a virtual environment (e.g., a graphical representation of an office or living room) including walls, furniture, windows, doors, etc. The request from the customer to view the electronic representation of the physical art may be received at a server that selects a size of a virtual environment in which to display a digital or electronic representation of the physical art using a size of the physical art. Various aspects of the virtual environment may be modified or configured based in part on the size of the physical art.

A computer-implemented system as described herein may provide an electronic representation of physical art in a virtual environment for viewing by customer. The system may provide the customer with an option to purchase the physical art in an available size. The electronic representation of the physical art in the virtual environment may be useful to the customer in visualizing the art as the physical art may appear in a specific or sample physical environment and also in conceptualizing a scale of the physical art relative to recognized physical objects, such as furniture and the like.

As a more specific example, a method for selling physical art may include storing an electronic representation of the physical art and a size of the physical art in an art data store. The size of the physical art may be received at a server from a seller or another provider of the physical art. The physical art may also be available in multiple sizes. Accordingly, an "available size" of art, as used herein, may refer to any physical size (e.g., 21 inches×36 inches) in which the physical art may be purchased, and may include, for example, a smallest available size, a largest available size, an average available size, a customer-selected available size and so forth. To display the electronic representation of the physical art, a virtual environment may be used. A "virtual environment" or "virtual room" may be a virtual space graphically represented to assist in visualization of the physical art provided to a customer over a network and may include a wide variety of types of virtual spaces, such as rooms, buildings, landscapes, cityscapes, oceanscapes, skyscapes and so forth. The virtual environment may be one of multiple virtual environments available for use in displaying an electronic representation of the physical art and may be stored in an environment data store.

The virtual environment may be configurable, either in response to a user request or based on various factors, such as a size of the physical art denoted by the electronic representation. When viewing electronic representations of physical art available for sale, customers may be provided with an option to display an electronic representation of physical art in a virtual environment. When a customer selects an option to display an electronic representation of the physical art, a request may be received at a server from a client device requesting display of the electronic representation of the physical art. The virtual environment may be configured, using the server, based on the available size of the physical art in response to the request. For example, a size of the virtual environment may be selected for displaying the physical art in the virtual environment based on the available physical size of the physical art. More specifically, when a customer selects physical art to be purchased in a large physical size, the electronic representation of the physical art may be displayed in a large virtual environment (e.g., in a large virtual room), and when the customer selects physical art to be purchased in a small size, the electronic representation of the physical art may be displayed in a small virtual environment (e.g., a small room). As another example, physical art available in multiple sizes may be displayed in a virtual environment selected based on the largest available size of the physical art to allow the customer to view any available size of the physical art in a same virtual environment. Based on the virtual environment selected using the size of the physical art, the size of the electronic representation of the physical art may be scaled to a corresponding virtual scale of the virtual environment. The electronic representation of the physical art in the virtual environment may be provided for display with a user interface, and may include an option to purchase the physical art in any of the available sizes. A server processing requests for display of the electronic representation of the physical art may generate a user interface for display on a client computing device that may further include the virtual environment with the electronic representation of the physical art.

Referring to FIG. 1, an illustration of a user interface including a virtual environment 110 is depicted in which an electronic representation of a physical item, (e.g., an electronic representation of physical art 115) is displayed and the physical item is made available for purchase in accordance with an example of the present technology. As used herein the term "art" may be synonymous with "work of art" or "artwork." The virtual environment 110 may be sized to fill a majority or an entirety of a width of a display of a client computing device. User interface controls or options, such as the information box 130, may be provided as an overlay over the virtual environment 110, with the virtual environment 110 extending behind and beyond the information box. The information box 130 may be positioned to not overlap or otherwise obscure any portion of the electronic representation of physical art 115 being displayed.

The virtual environment 110 may include electronic representations of one or more other physical objects, which (when presented with the electronic representation of the physical item or physical art) are preferably of a size or type to provide an indication of scale of the physical objects to a customer. Such electronic representations of other physical objects or physical features in a virtual environment may be referred to herein as virtual objects or features. For example, FIG. 1 illustrates a virtual couch 120. While individual sizes of physical couches may vary somewhat, a virtual couch 120 placed next to the electronic representation of the physical art 115 in this example may provide an indication of a relative size of the physical art to a couch in a physical environment. Thus, customers may be able to conceptualize or visualize how the physical art corresponding to the electronic representation 115 may look next to the customer's own couch. For example, using an imaging device, such as camera, cellphone and/or tablet with imaging capability, a customer may capture and submit an image of his or her own couch, so that a virtual representation of the couch can be added to the virtual environment and the customer can envision how the physical art would appear next to the customer's couch.

To assist in an indication of scale, a user interface including the virtual environment 110 may optionally include dimensions or indicators 125a-b of dimensions for one or more objects or features of the virtual environment, such as a height of a room 125a, a height or width of the physical art or the electronic representation of the physical art, a length of a couch 125b, dimensions of furniture and so forth. The indicators 125a, 125b may alternately be a legend or other type of indicator that may be useful in identifying or deriving relative sizes of the displayed virtual environment, virtual items and virtual objects. In one aspect, dimensions or other size or scale indicators may be hidden by default and displayed upon request, or may be displayed upon a predefined event, such as a click or mouse-over event of an object detected or received at a server.

To enable relative scaling of the virtual environment, various aspects of the virtual environment may be sized or scaled by a computing device based on actual physical sizes of corresponding physical objects. For example, if a couch is six feet wide and a display area is 458 pixels wide representing an area of 9.5 feet in length or width, then the virtual couch may be sized to 288 pixels. Similarly, a size of the physical art may be converted to an electronic representation of the size of the physical art based on the display area of the virtual environment. However, while the electronic representation of the physical art may be scaled to a scale of the virtual environment, the virtual environment size may be selected based on the size of the physical art. As a result, other virtual objects in the virtual environment, such as furniture and the like, may be sized or scaled based on the size of the physical art. Displaying the art in a visually pleasing manner may involve scaling virtual environments differently based on a variety of factors, including, for example, the size of the physical art, the virtual size of the electronic representation of the physical art relative to the virtual environment or device display size, the device display size on which the electronic representation of the physical art is to be displayed, customer preferences and so forth. For example, smaller physical art sizes may be displayed at an increased viewing scale relative to larger physical art sizes for a same screen size. In other words, the smaller art and surrounding virtual environment may be displayed proportionally larger relative to the physical screen size than a larger electronic representation of the physical art and surrounding virtual environment.

In one aspect, a system may associate an electronic representation of the physical art with a visual reference to convey a size or scale. For example, the electronic representation of the physical art may be displayed with virtual objects such as furniture, people, computers, televisions, etc., or with scale or size indicators and so forth to provide a sense of size of the art or scale of the environment, where the electronic representation of the physical art and other visual references are sized relative to an actual physical size of the physical art and also optionally based on the physical size of the physical objects to with the virtual objects correspond, depending on the visual objects selected for display.

The electronic representation size of the physical art may be dynamic. For example, the system may utilize a number of factors, such as display screen size, graphical user interface or window size, size of the physical art, scaling of the virtual environment and other factors to size the image of the physical art. The size of the electronic representation of the physical art may be based on the size of the physical art and/or may be based on a size of a physical frame surrounding the physical art. In one example, a seller may provide a selected number of frames for the electronic representation of the physical art. The electronic representation of the physical art may include a virtual representation of the frame or the electronic representation of the physical art may be inset into an image or other virtual representation of the frame. Sizing and scaling of the electronic representation of the physical art and/or the other portions of the virtual environment may be based on a framed size or an unframed size of the art. As used herein, a "frame" refers to a framework in which art is mounted, and thus, may also be referred to as a "picture frame."

The size(s) of the physical art with and/or without a frame may be stored in an item data store with an associated item identification number identifying the item. When a customer selects an electronic representation of the physical art to view in the virtual environment, the system may perform a lookup for an identification number associated with the selected electronic representation of the physical art to identify the relevant size(s). The system may then use the identified size(s) to select and/or configure the virtual environment.

The system may dynamically modify a position of the electronic representation of the physical art in the virtual environment as a user interface size changes in an application or an operating system. For example, when the virtual environment is displayed in a browser user interface or window and a size of the browser user interface is changed horizontally, space may be trimmed from the left and the right sides of a view of the virtual environment to center the electronic representation of the physical art in the resized user interface, with centering being optionally relative to an included information or purchase box. As another example, the virtual environment, including the electronic representation of the physical art, may be scaled in response to a change in user interface size. The size of the electronic representation of the physical art and of the virtual environment may be scaled or resized corresponding to a relative change in size of the user interface. In one aspect, the scaling of the virtual environment may differ from scaling of the user interface. For example, while the virtual environment may be scaled to a reduced size when the browser user interface size is reduced, the size of the virtual environment relative to the user interface size may be increased to better display the electronic representation of the physical art in the reduced user interface size.

Various rules may be created and stored in a rules data store for managing sizing of virtual environments, electronic representations of the physical art and the like. The rules may be received from a system administrator or may be machine-learned rules. For example, a set of rules may indicate that for an electronic representation of physical art using a defined pixel density, a vertical distance from a bottom edge of a baseboard near a floor and along a base of a wall of a virtual room up to a ceiling of the room may be set at 428px (pixels) or 8.9 feet (feet). Rules may define that for a room of this size, a maximum electronic representation of the physical art size (height) is 295px, which may accommodate electronic representations of physical art having a physical size of up to 72 in. (inches) tall. A width of environment of 1650px wide may accommodate electronic representations of physical art with a physical width of 108 in., if the height of the physical art is less than 72 in., and the width may also be selected to allow space for the information box to be displayed adjacent to the electronic representation of the physical art. Margins or padding may be defined for spacing electronic representations of the physical art from the ceiling, the floor, furniture and so forth. Rules may define various sized margins for various sizes of electronic representations of physical art. Rules may define a relative scale of physical to virtual sizes. For example, to scale the 6 ft wide couch to 288px as in FIG. 1, a scale of 1 foot=48px (or 4px per inch) may be used. It is noted that while an example scale is described in connection with the illustration in FIG. 1, FIG. 1 and the other figures included herein are example constructions that are not necessarily drawn to any particular scale, but are simply provided for illustration purposes.

The system may select or configure the virtual environment to include one or more substantially fixed size virtual objects, such as couches, human figures, benches, animals, etc. Dimensions of the virtual objects may be spelled out clearly in some form over or on an edge of the virtual environment, such as a line indicating that the floor to ceiling distance is 9 ft or that the length of the couch is 6 ft. The virtual environment may be selected or sized to accommodate multiple different sizes of the selected physical art. For example, the virtual environment or the size of the virtual environment may be based on a largest available size of the selected physical art. With an environment selected or configured to display the largest available size of the physical art, a customer can optionally view any available sizes using an electronic representation(s) of the physical art without re-selecting, re-scaling, or otherwise re-configuring the virtual environment.

In one aspect, virtual environments may be created to accommodate a large number of types and sizes of original art, or electronic representations of the physical art, but the art for display is not limited to original art and may further include copies, reproductions, derivative works and so forth of original art. For example, many items of original art sold are between the sizes of 8"×10" and 30"×40." Thus, virtual environments may be created or configured to accommodate electronic representations of physical art within these size ranges. If a size of the physical art is larger than 72" in height and/or 120" in width, then some of the virtual environments selected for other, smaller sizes of physical art may be unsuitable for display of the larger sizes. As a result, a different, larger virtual environment may be used, or the virtual environments used for the smaller sizes may be scaled or otherwise reconfigured to accommodate larger size electronic representations of the physical art. To accommodate smaller sizes of physical art, such as in the range of 8"×10" to 12"×24" for example, a "zoomed in" version of the virtual environment may be rendered to allow the customer to view the electronic representation of the physical art as if the customer were standing closer to the wall on which the electronic representation of the physical art is hanging. For larger electronic representations of the physical art, the same virtual environment may be rendered, but may be rendered in a "zoomed out" view, as if the customer were to take a few steps back in order to see the larger electronic representation of the physical art in more context.

The virtual environment may be selected or designed to avoid specific styles or aesthetics in order to appeal to a broad audience. The virtual environment may permit the electronic representation (e.g., image) of the physical art to be modified or replaced. In other words, a virtual environment or virtual gallery may be customizable via a user interface to enable the swapping of many electronic representations of different pieces of physical art into the virtual environment or to modify an appearance or configuration of the virtual environment.

The virtual environment may be configured to distinguish an edge of the electronic representation of the physical art or a frame around the electronic representation of the physical art from the virtual environment (e.g., to distinguish an electronic representation of the physical art in a white frame from a white wall). For example, this distinguishing format may be achieved with a thin border, shadow, or other convention suitable to delineate the electronic representation of the physical art or frame from the wall.

The virtual environment may also be selected or configured based on a characteristic of the physical art other than a size of the physical art. Thus, while many of the examples herein focus on virtual environment configuration based on size, other non-limiting example characteristics that may be considered in addition to or instead of the size of the physical art, may include: a color or dominant color of the physical art, whether a frame is included with the physical art, a frame type (e.g., wood, marble, plastic, metal, etc.), a frame size, a frame style, a collector preference, customer preference, a seller preference, an art category and so forth. For example, a seller may indicate a preference to display the electronic representation of the physical art in a specifically identified virtual environment or a virtual environment satisfying a set of specified conditions. If an art category for the physical art designates the physical art as being intended or suitable for large rooms, then the virtual environment may be selected to match the art category.

An electronic retailer, such as a network-based retailer, may have various advantages over traditional brick-and-mortar retailers. For example, when a physical storefront is not maintained and a network page, such as a webpage, operates as a storefront, the showroom for the electronic retailer may be virtually unlimited. In the context of art sales, such an electronic retailer may provide a virtual environment for a large curated selection of art, original or otherwise, that may be unmatched in terms of size or quality by other retailers limited by the use of physical showrooms or galleries. The shopping experience, detailed item information and accuracy of representation of art (e.g., color, quality, resolution, lighting, etc.) in the virtual environment of the electronic retailer may be equivalent or superior to the physical galleries of other retailers, and an electronic retailer may also provide additional convenience, reduced pressure and an overall more relaxing and pleasing art purchasing experience. The electronic retailer may recreate the experience of viewing art on display in a customer's personal space or in a gallery, and may assist customers in the discovery of art meeting customer expectations.

While many of the examples herein are directed toward the display of an electronic representation of physical art, the technology may be more broadly applicable to a wide variety of other types of items or objects. For example, rather than displaying electronic representations of physical art in the virtual environment, electronic representations of other objects for sale may be displayed in the virtual environment, such as electronic devices (e.g., large televisions, stereo equipment, computers), lighting fixtures (e.g., lamps, etc.), tables, book cases, storage furniture (e.g., storage cabinets or containers), musical instruments (e.g., pianos, drums, etc.), clothing and so forth. Further, a customer may select to view a particular television in the virtual environment positioned on a television stand. Then, the television stand may be switched with other television stands in a manner similar to options for switching frames displayed with art, as described later. As another example, a customer may view an electronic representation of a physical piano in a room. An electronic representation of almost any object may be displayed in the virtual environment, where the virtual environment may be selected, sized, scaled and/or configured based on a characteristic of the object, such as size, color, shape, customer preference, seller preference, object category and so forth, as well as combinations thereof. In addition, whereas physical art may have an electronic representation that is characterized as art, other physical objects that may or may not be considered physical art may also have an electronic representation that may be characterized as art. For example, a digital image used to represent the object in the virtual environment may be art.

Figure 2:
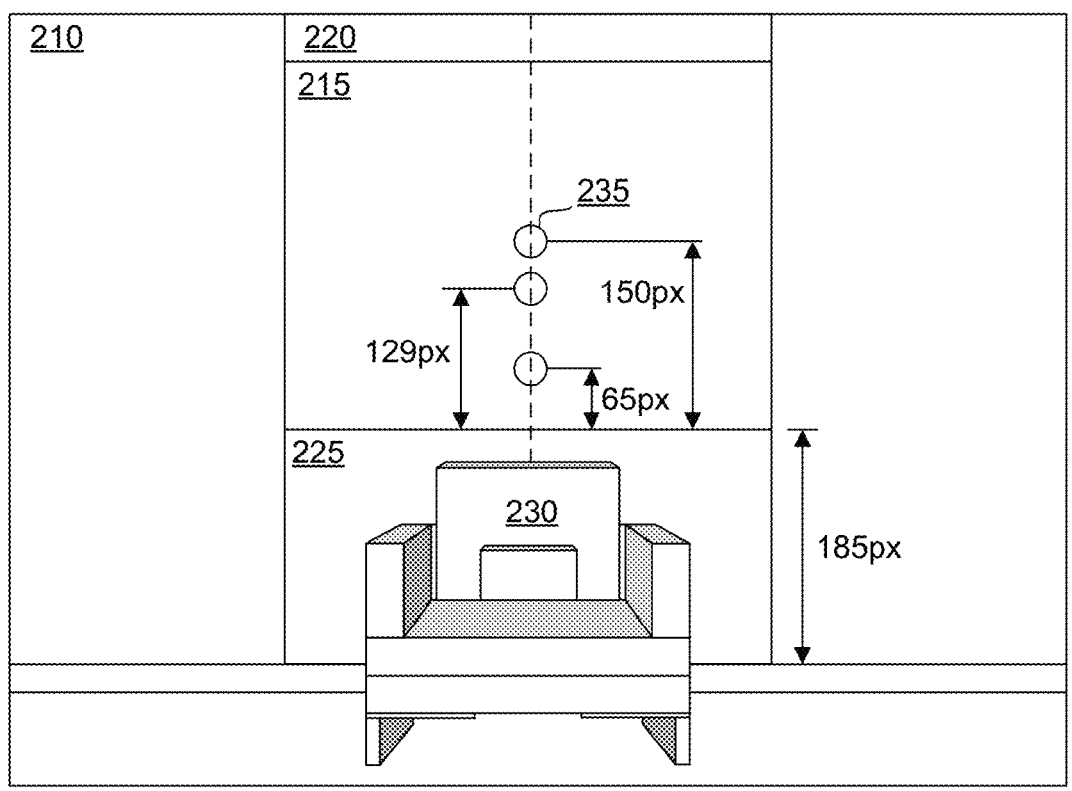
FIG. 2 is an illustration of user interface including a virtual environment with differing centering heights for centering art of different widths in accordance with an example of the present technology.

Referring to FIG. 2, an example user interface including a virtual environment 210 is illustrated for displaying electronic or digital representations of physical art. Various dimensions are illustrated in the virtual environment indicating a different centering height 235 for different sizes of digitally or electronically represented physical art. A "centering height," as referred to herein, may refer to a vertical height from a defined location in the virtual environment at which a center of the electronic representation of the physical art is to be positioned. The virtual environment may include a display area 215 in which the electronic representation of the physical art is to be displayed at various sizes. The display area 215 may be adjacent to one, two or more buffer areas 220, 225, which may limit the display area 215. For example, the inclusion of the chair 230 in the displayed environment 210 may result in a buffer area 225 of 185px based on a buffer rule associated with the chair 230 or chair size. Centering rules may be used to define a centering height for centering different sizes of the electronic representations of the physical art above the buffer area. For example, a centering rule may define a centering height of 65px from the bottom of the display area 215 for images with a width of up to 24 in. A centering rule may define a centering height of 129px from the bottom of the display area 215 for images with a width of up to 60 in. A centering rule may define a centering height of 150px from the bottom of the display area 215 for images with a width of up to 112 in. Rules may base centering on a width, a height or another dimension of the electronic representation of the physical art, or a combination of dimensions. Also, while the example rules define a height from a bottom of the display area, other rules may define a height from a top of the display area 215 or a width from a side of the display area 215, or may include a combination of limitations on heights and/or widths from different sides of the display area 215. For example, a rule may set a height from a bottom of the display area 215 for images of a particular width, but the rule may result in a height of the electronic representation of the physical art extending into the upper buffer area or may conflict with a rule setting a minimal or maximal height from a top of the display area 215. In such case, another rule may define how to display the electronic representation of the physical art in the event of a conflict of rules, such as to make a compromise and allow the electronic representation of the physical art to violate one or more of the rules.

The above-described example rules have focused on a centering height. Rules defining a centering width may also or alternatively be implemented. For example, an electronic representation of the physical art may not be particularly aligned, centered or otherwise positioned with respect to furniture or other items in the virtual environment, and the horizontal positioning of the electronic representation of the physical art may vary based on a size of the physical art, a size of the electronic representation of the physical art, a size of the environment and so forth. However, in many implementations a horizontal or width-wise centering of the electronic representation of the physical art may not vary for different sizes of physical art because the electronic representation of the physical art may often be horizontally centered relative to furniture or other objects in the virtual environment, so the horizontal centering may be fixed for any size of physical art based on a centerline of a furniture object. FIG. 2 illustrates a center line that is centered relative to the chair and that may correspond to the different centering heights for different sizes of physical art.

Figure 3:
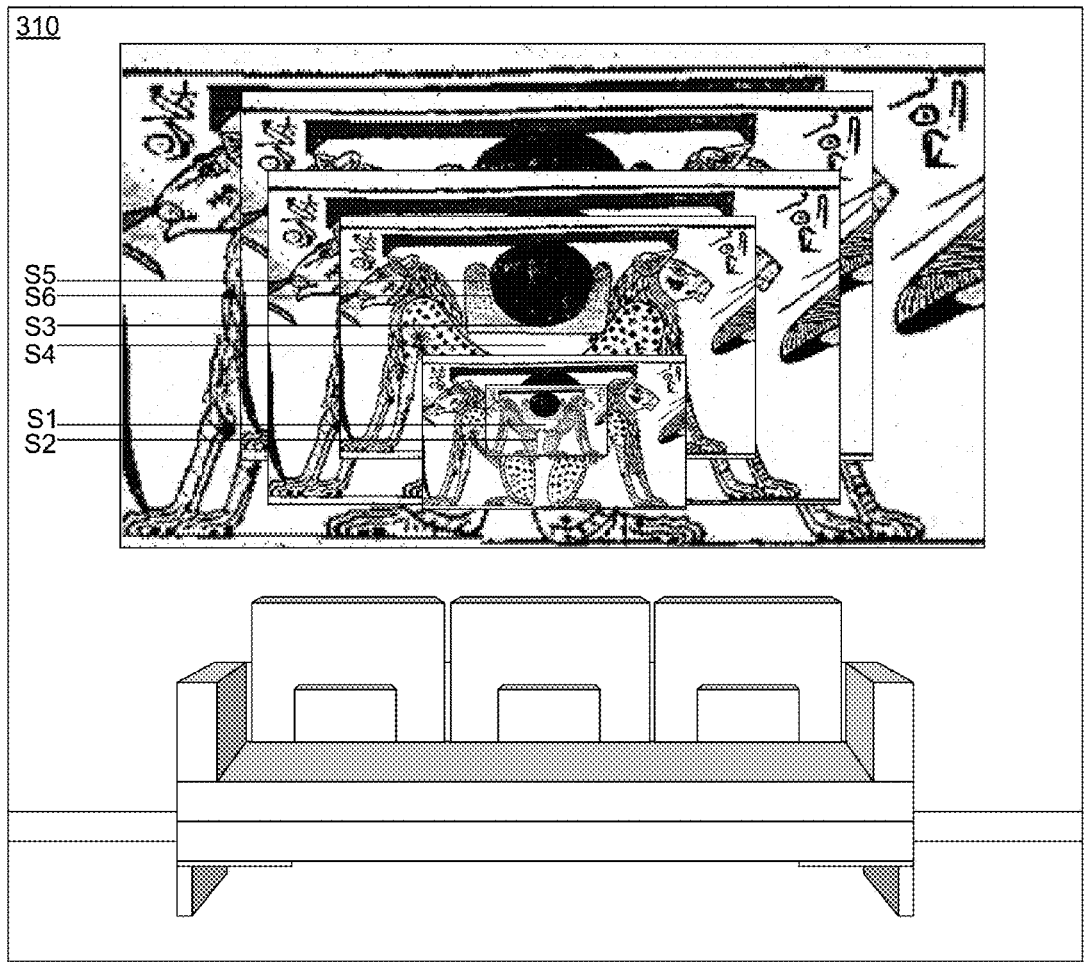
FIG. 3 is an illustration of a user interface in which multiple different sizes of art have different centering heights based on different sizes of the art in accordance with an example of the present technology.

FIG. 3 is an example illustration of a user interface including a virtual environment 310 where multiple different sizes of electronic representations of physical art are overlaid on one another to illustrate an example variance in centering height for the different sizes. FIG. 3 includes six images of the same physical art at different sizes. While the example in FIG. 2 illustrates a centering height that increased or was adjusted upward with an increase in a width of the electronic representation of the physical art, FIG. 3 illustrates that a centering height may vary non-linearly, or rather may be adjusted up or down for different sizes by the system without consistently adjusting upward for larger sizes. The centering heights for the different sized images have been labeled S1 to S6, where S1 represents a centering height of the smallest image and S6 represents a centering height of the largest image, the image sizes being progressively larger from S1 to S6.

Figure 4A:
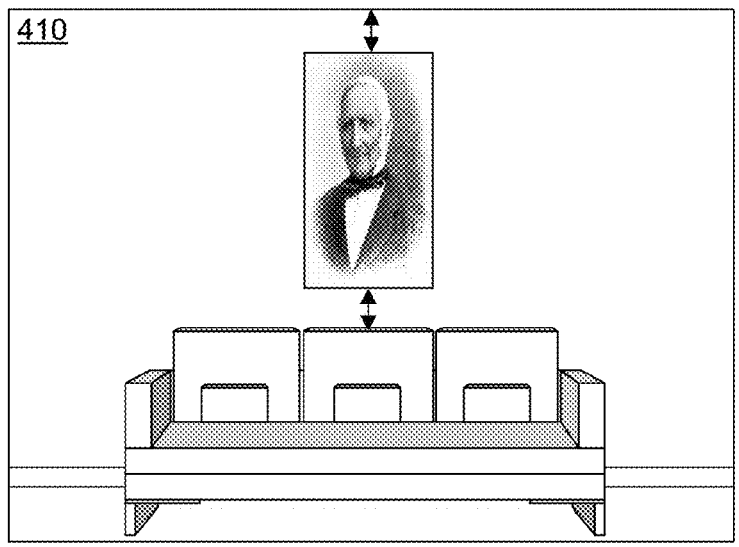
FIGS. 4a-4c are illustrations of user interfaces in which a virtual room is used to display art vertically centered within a defined display area that is smaller than the virtual room, in accordance with an example of the present technology.
Figure 4B:
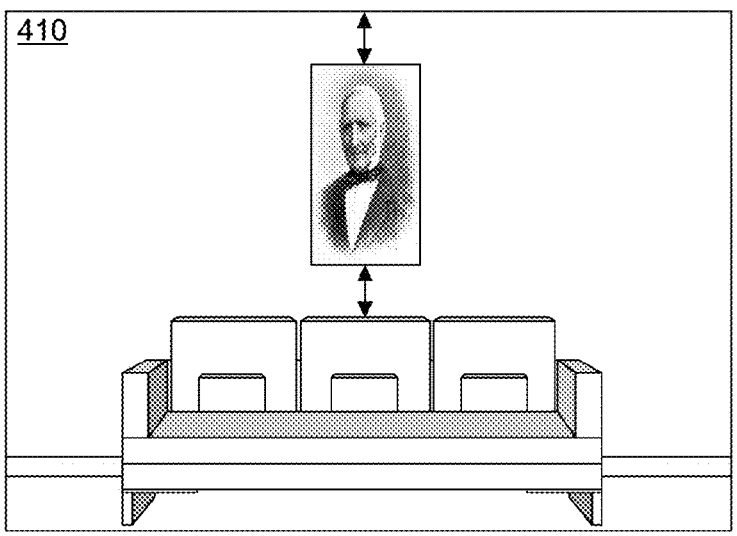
Figure 4C:
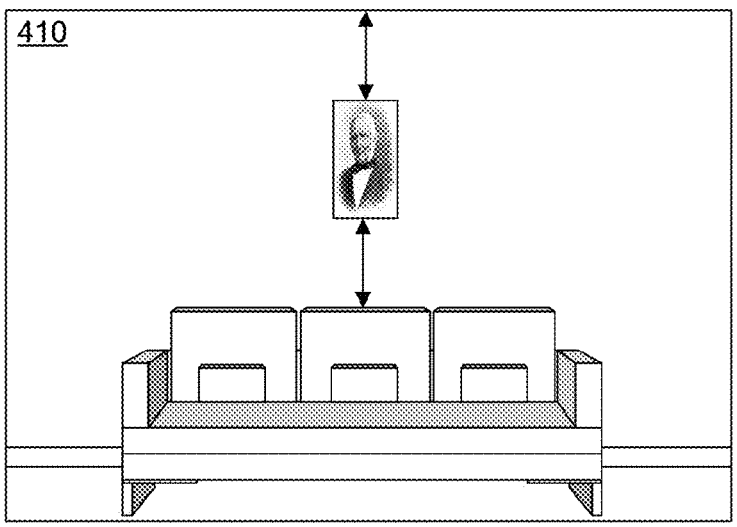

The virtual environment 410 in the user interface of FIGS. 4a-4c also illustrates a variance in centering of an electronic representation of the physical art depending on a size of the electronic representation of the physical art, where the electronic representation of the physical art is a vertically oriented electronic representation of the physical art, or an electronic representation of the physical art in which the vertical dimension is greater than the horizontal dimension. In this example, the centering height centers the electronic representation of the physical art between the couch and the ceiling, which define vertical bounds of the display area. In other words, a height from the couch to a bottom of the electronic representation of the physical art is the same as a height from a top of the electronic representation of the physical art to the ceiling. This configuration is not specific to vertical or portrait-oriented art, but merely serves as an example centering configuration.

As another example of positioning an electronic representation of the physical art, a static or fixed center point may be used at which to position a center of the electronic representation of the physical art to be displayed regardless of a size of the physical art, orientation and/or configuration of the physical art, the electronic representation of the physical art, or the virtual environment. In this example, physical art that is available in multiple sizes may have electronic representations thereof positioned with a center point at a same position in the virtual environment regardless of which of the multiple sizes of the electronic representations of the physical art is viewed or regardless of whether the customer switches between views of different sizes of the physical art.

Figure 5:
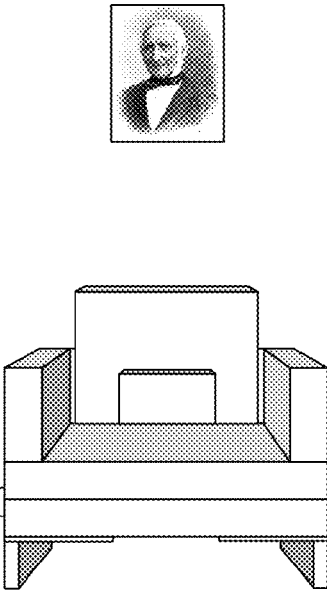
FIG. 5 is an illustration of a user interface in which a virtual room selected for display is displayed with a relatively smaller size of art in accordance with an example of the present technology.

FIG. 5 illustrates a user interface demonstrating that a relatively smaller virtual environment 510 may be used for physical art with smaller maximum available sizes. For example, FIG. 1 illustrated a virtual environment 110 with a large couch that may be configured to accommodate a relatively large electronic representation of physical art. FIG. 5 illustrates a virtual environment 510 with a chair, which may be relatively smaller than the couch of FIG. 1. The virtual environment 510 including the chair may be selected by a customer or by the system for displaying the electronic representation of the physical art when the size of the physical art is small, or below a size threshold, in order to "enlarge" the overall dimensions of smaller works within a smaller context. The scale of the smaller virtual environment, or rather the number of pixels per physical dimension unit (e.g., inches, cm, etc.), may vary from the scale used for larger virtual environments. For example, whereas the scale for FIG. 1 was described as 1 ft=48px (4px per inch), the scale of FIG. 5 may be 1 ft=72px (6px per inch). Smaller virtual environments may be used for small pieces of physical art, such as an environment including a small table or stand, over which the electronic representation of the physical art is displayed. As has been described, further options for displaying smaller electronic representations of the physical art include rendering the virtual environment, including the electronic representation of the physical art, in a "zoomed in" view where a scale has been increased to display the electronic representation of the physical art in greater detail or as if the customer had stepped closer to the electronic representation of the physical art on the wall in the virtual environment.

Figure 6:
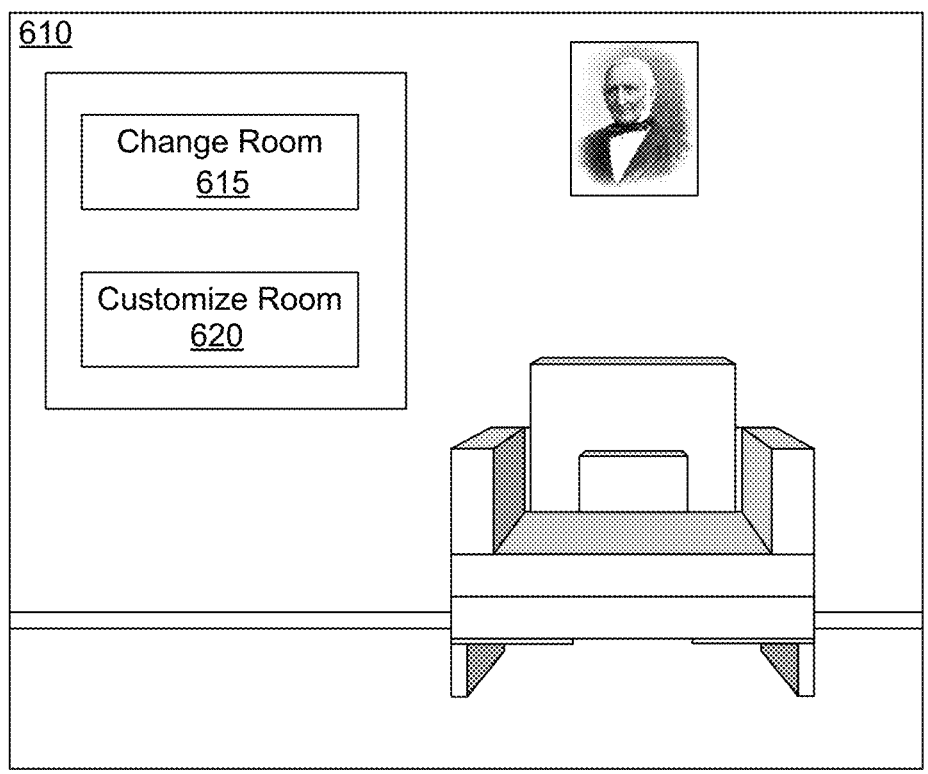
FIG. 6 is an illustration of a user interface including user interface options for changing or customizing the virtual room in accordance with an example of the present technology.

FIG. 6 illustrates an example user interface that may be provided for display with the virtual environment 610 to enable customers to customize their experience of viewing the electronic representation(s) of the physical art. Specifically, the virtual environment of FIG. 6 may include an option to "change room" 615 or to select a different virtual environment. Whereas the example view shown includes an armchair, a different example environment may be a bedroom where the electronic representation of the physical art is displayed over a bed or a great room where the electronic representation of the physical art is displayed over a fireplace. In another example, the size of the virtual room may be changed by the server in response to a request from the customer.

The user interface in FIG. 6 further enables customers to customize the current virtual environment using the "customize room" option 620. For example, customers may add or remove furniture; move the furniture or electronic representation of the physical art relative to one another; change colors of paint, wallpaper, flooring, furniture, etc.; change a style of wall, flooring, furniture; and so forth.

In one example, the electronic retailer may provide various furnishings for sale. The customer may be able to add these items for sale into the virtual room with the electronic representation of the physical art, including an option to replace or remove existing items in the virtual environment. The customer may also purchase the items added to the room, if the customer likes the items selected to go with the physical art.

Figure 7:
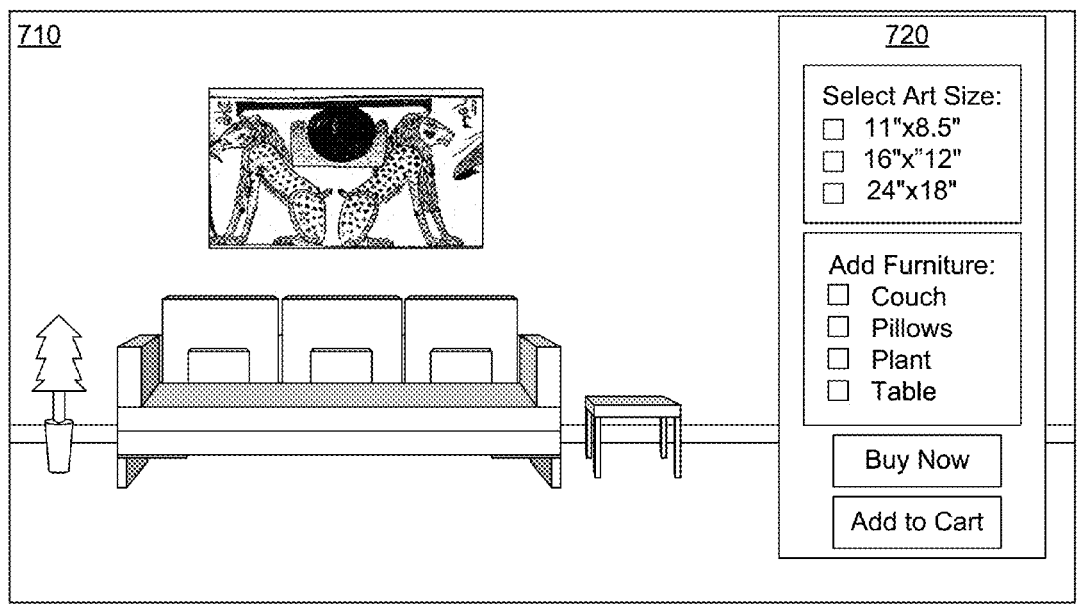
FIG. 7 is an illustration of a user interface including a virtual room having a user interface option to purchase items in the room other than the displayed art in accordance with an example of the present technology.

FIG. 7 illustrates an example user interface including a virtual environment 710 that may have been provided as a default environment for display by the system or may have been customized by the customer. In the information box 720, along with the options to select a size of the physical art for purchase, the user interface may include options to purchase items included as virtual objects in the virtual environment 710, such as the couch, the pillows on the couch, the plant, or the table. In other words, the customer may purchase physical items corresponding to the virtual objects displayed in the virtual environment. The customer may thus purchase items in the virtual environment 710 to at least partially recreate the virtual environment 710 physically in the customer's home or another location. The items included for sale in the virtual environment 710 may optionally be selected or designated by a seller of the physical art, where the electronic retailer may be different from and independent of the actual seller of the physical art. For example, the art seller may be a third party or middle-man providing the virtual room or environment and facilitating the interaction and/or purchase between the customer and the seller.

Figure 8:
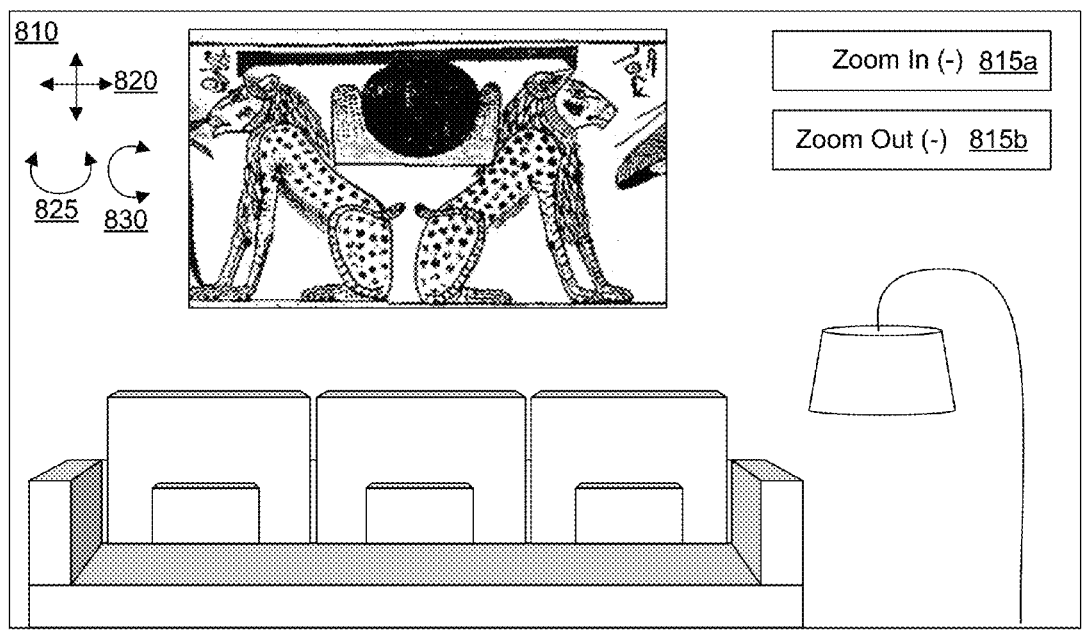
FIG. 8 is an illustration of user interface options in a virtual room for modifying a point of view of the virtual room in accordance with an example of the present technology.

FIG. 8 illustrates another example user interface including zoom controls 815a, 815b to allow the user to zoom in or out in the virtual environment 810. Other user interface controls for manipulating the view may also be provided, such as navigational arrows 820 to move the point of view to the side, upward or downward (e.g., translational movement). Additionally, the user interface controls may enable adjustment of viewing angle, such as horizontal 825 and vertical 830 tilt controls. Any of a number of other user interface options may also be included to facilitate various potential user interactions for a specific implementation of the present technology.

Figure 9:
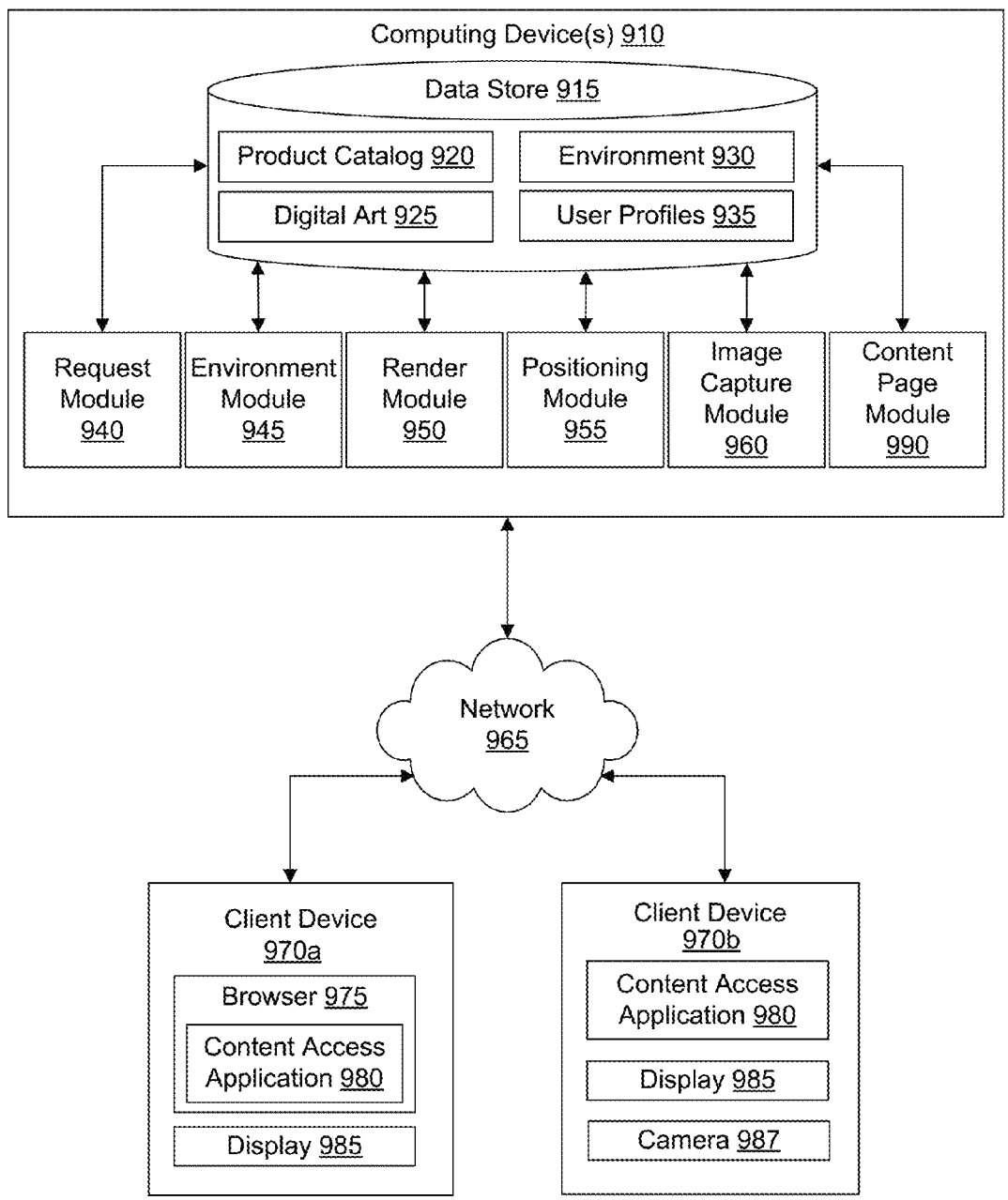
FIG. 9 is a block diagram of a system for providing art for display in accordance with an example of the present technology.

Referring now to FIG. 9, a block diagram of a system to display an electronic representation of physical art for purposes of selling corresponding physical art is illustrated in accordance with an example of the present technology. The system may be implemented on one or more computing devices 910 that interface with client devices 970a-970b and communicate using a network 965. The system may include a data store 915 and execute a number of modules 940, 945, 950, 955, 960, 990 for storing and processing art and other item data.

The data store 915 may include an item catalog data 920. The item catalog data 920 may include, for example, items available for purchase or consumption from an electronic retailer. Information regarding such items may be structured for suitable presentation on a display 985 of a client device's 970a, 970b via a browser 975 (e.g., in the form of a network page or network site) or content access application 980. The item catalog data 920 may also include item identifiers (e.g., such as alphanumeric values or the like) for unique item identification, item detail information and so forth. The item catalog may include item data for the physical art available for sale and may further include item data for other items also for sale, such as frames, art hanging accessories, corresponding physical furniture items of virtual furniture items displayed in the virtual environment and so forth.

The data store 915 may include digital art data 925. For example, the digital art data may include electronic representations of physical art available for purchase from the electronic retailer. The item catalog data 920 may include references to the digital art data in order to retrieve a corresponding image for use in the virtual environment when a customer requests a view of the electronic representation of the physical art in the virtual environment. In addition to storing an electronic representation of physical art, the digital art data 925 may further include available sizes of the electronic representations of the physical art. In other words, different resolutions or sizes of the electronic representations may be available in sizes or resolutions corresponding to available sizes of the physical art. The digital art data 925 may also include available sizes of the physical art or such data may be included in the item catalog data 920.

The data store 915 may also include user profile data 935. The user profile data 935 may include, for example, demographic information about the customer or user (such as location, age, gender, etc.), user preferences, purchase history, browsing history, viewing history and so forth. In one example, user profile data may include virtual environment configurations, such as preferences, saved virtual environments, customizations and so forth.

The data store 915 may include environment data 930, which may include the various virtual environments available, as well as rules concerning sizing, customizations and so forth of the virtual environment that may be applied when rendering the electronic representation of the physical art in the virtual environment.

The system may implement various software modules or applications including specific computer-executable instructions, that when executed by one or more processing units of a computing device 910, cause the computing device 910 to perform certain operations. Such modules or applications may be stored in a local memory or in another local or remote data store, such as data store 915. For example, such modules may include a request module 940. The request module 940 may receive requests from a client device 970a, 970b for viewing of electronic representation of the physical art in a virtual environment. For example, a request may be initiated by a customer by clicking, tapping, selecting or otherwise indicating via the client device 970a, 970b a desire to view the electronic representation of the physical art. The request may originate from an item detail page or another summary page for the physical art that is provided by an electronic retailer.

An environment module 945 may access the environment data 930 to retrieve a virtual environment in response to receipt of the request received by the request module 940. The environment module 945 may configure a size of the selected virtual environment based on the available size of the physical art. For example, the environment module 945 may select the virtual environment based on the available size of the physical art or may modify or otherwise configure the virtual environment based on the available size of the physical art. In some examples, the environment module 945 may configure the virtual environment by modifying a scale of the virtual environment, modifying a number or placement of virtual objects in the virtual environment, or selecting one virtual environment from a plurality of available virtual environments for use in displaying the electronic representation of the physical art.

The system may also implement a display module or render module 950. The render module 950 may provide the electronic representation of the physical art in the virtual environment for display. In other words, the render module 950 may render the electronic representations of physical art in the virtual environment, following defined rules regarding sizing, scaling, spacing and so forth. The render module 950 may be operable with a content page module 990 to display an option to purchase the physical art in the available size. The render module 950 may also render the electronic representation of the physical art for display in the virtual environment and to scale with the virtual environment. The render module 950 may further render an indication of the scale in the virtual environment as a reference for customers.

The system may further implement a positioning module 955 to position the electronic representation of the physical art in the virtual environment. The positioning of the electronic representation may be based on the available or selected size of the physical art. The positioning may also be performed according to centering or other positioning rules or constraints stored in the environment data store 930 or the positioning module 955. The data provided by the positioning module 955 for positioning the electronic representation of the physical art in the virtual environment may be pre-computed prior to a request to position the electronic representation in the virtual environment or the positioning module may dynamically calculate the appropriate position in response to a request to position the electronic representation of the physical art in the virtual environment.

The system may implement the content page module 990 to display content pages or other user interfaces, including search fields, item data, virtual environments and any other suitable object or data for facilitating or enhancing user interaction with the electronic retailer, display or sale of art to customers and so forth.

The render module 950, positioning module 955 and/or content display module 990 may form or be part of a display module that performs display related functions relative to displaying the electronic representation of the physical art to customers. In one example, the display module may center the electronic representation of the physical art relative to a display screen size of the client device. For example, the virtual environment may be sized or scaled to extend across a majority of the display screen size or user interface size. An option to purchase the physical art may overlay the virtual environment and may be offset from the electronic representation of the physical art so as to not obstruct any portion of the electronic representation of the physical art.

The content page module 990 may enable user feedback on the virtual environments. For example, the content page module 990 may enable customers to comment or vote on available virtual environments. In one aspect, user-modified virtual environments may be stored and may be available for viewing by other users. Such user-modified or user-created virtual environments may be voted on, commented on, ranked, etc. by other users. In a similar manner to which customers may be given an option to purchase physical art along with the items or objects in the environment in which the electronic representation of the physical art is displayed, customers may be enabled to purchase the items in other user-created rooms. For example, a user may view a user-created room within a given price range for the room, including the electronic representation of the physical art and furniture, and may purchase all of the items in the room or individual items from the room as desired. In one example, the user may be enabled to sort through favorite or highest ranked room and art combinations using filters, keywords and so forth.

The system may optionally be configured to render or overlay the electronic representation of the physical art onto a dynamic virtual environment. For example, the system may implement an image capture module 960 to receive one or more captured images. The environment module 945 may create a virtual environment based on the captured image(s) and the render module 950 may render the electronic representation of the physical art in the created virtual environment. The content page module 990 may then display a user interface including the virtual environment created from the captured image(s) and electronic representation of the physical art. For example, the captured image(s) may be a photograph or video, which may include recorded or live video, captured by an imaging device, such as camera, cellphone and/or tablet with imaging capability, etc. 987 on a client device 970b. The captured image(s) may be of a real environment, such as the customer's living room, for example. The system may dynamically modify sizing, skew angle, scale, etc. of the electronic representation of the physical art as the client device 970b is moved within the real environment and captures images. The system may identify depth, distance, objects and so forth in the real environment, which identification may be used to create a non-visual data structure for accurately displaying the electronic representation of the physical art in the captured image(s). For example, the customer may point the camera 987 of his or her computing device 970b at a flat surface, such as a blank wall, and view the surface via the display 985 with an overlay of the electronic representation of the physical art. The customer may then physically move around the room to view the electronic representation of the physical art on the flat surface from different angles via the display 985.

Returning to FIG. 9, the computing device(s) 910 may include one or more servers in communication with the data store 915. The data store 915 may store item catalog information, user profiles, electronic representations of physical art, virtual environments, rankings, etc. for the server. The term "data store" may refer to any device or combination of devices capable of storing, accessing, organizing, and/or retrieving data, which may include any combination and number of data servers, relational databases, object oriented databases, simple network storage systems, web services, hosted or "cloud" storage systems, data storage devices, data warehouses, flat files, and data storage configuration in any centralized, distributed, or clustered environment. The storage system components of the data store may include storage systems such as a SAN (Storage Area Network), a hosted or "cloud" storage network, volatile or non-volatile RAM, optical media, hard-drive type media, or any other type of non-transitory computer-readable media.

Client devices 970a-970b may access data, network pages, content items and so forth via the computing device 910 over a network 965. Example client devices 970a-970b may include, but are not limited to, a desktop computer, a laptop, a tablet, a mobile device, a television, a cell phone, a smart phone, a hand held messaging device, a set-top box, a gaming console, a personal data assistant, an electronic book reader, heads up display (HUD) glasses, a car navigation system, or any device with a display 985 that may receive and present the media content.

Customers or other users may be identified via various methods, such as a unique login and password, a unique authentication method, an Internet Protocol (IP) address of the user's computer, an HTTP (Hyper Text Transfer Protocol) cookie, a GPS (Global Positioning System) coordinate, or using similar identification methods. A user may have an account with the server, service or provider, which may optionally track purchase history, viewing history, store user preferences and profile information and so forth.

The system may be implemented across one or more computing device(s) 910, 970a, 970b connected via a network 965. For example, a computing device 910 may include a data store 915 and may implement or execute various engines and/or modules such as those described above. Such modules may be executable by a processor of the computing device 910. Some of the modules, such as the render module 950 for example, may alternatively be executed on a client device where the processing power is available on the client devices 970*a*-*b* for performing rendering, positioning, and other desired functions.

The modules that have been described may be stored on, accessed by, accessed through, or executed by a computing device 910. The computing device 910 may include, for example, a server computer or any other system providing computing capability. Alternatively, a plurality of computing devices may be employed that are arranged, for example, in one or more server banks, blade servers or other arrangements. For example, a plurality of computing devices together may include a clustered computing resource, a grid computing resource, and/or any other distributed computing arrangement. Additionally, it should be noted that in some embodiments, the computing device 910 may be executed by one more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment. For purposes of convenience, the computing device 910 is referred to herein in the singular form. Even though the computing device 910 is referred to in the singular form, however, it is understood that a plurality of computing devices may be employed in the various arrangements described above.

Various applications and/or other functionality may be executed in the computing device 910 according to various embodiments, which applications and/or functionality may be represented at least in part by the modules that have been described. Also, various data may be stored in a data store 915 that is accessible to the computing device 910. The data store 915 may be representative of a plurality of data stores as may be appreciated. The data stored in the data store 915, for example, may be associated with the operation of the various applications and/or functional entities described. The components executed on the computing device 910 may include the modules described, as well as various other applications, services, processes, systems, engines or functionality not discussed in detail herein.

The client devices 970*a*, 970*b* shown in FIG. 9 are representative of a plurality of client devices that may be coupled to the network. The client devices may communicate with the computing device over any appropriate network, including an intranet, the Internet, a cellular network, telephone network, a local area network (LAN), a wide area network (WAN), a wireless data network, a cable network, a satellite network, or similar networks or combination of networks. Those skilled in the art will appreciate that the network 130 may be any wired network, wireless network or combination thereof. Protocols and components for communicating via the Internet or any of the other aforementioned types of communication networks are well known to those skilled in the art of computer communications and thus, need not be described in more detail.

Each client device 970*a*, 970*b* may include a respective display 985. The display 985 may include, for example, one or more devices such as cathode ray tubes (CRTs), liquid crystal display (LCD) screens, gas plasma based flat panel displays, LCD projectors, or other types of display devices, etc.

Each client device 970*a*, 970*b* may be configured to execute various applications such as a browser 975, a respective page or content access application 980 for an network-based retail store and/or other applications. The browser 975 may be executed in a client device 970*a*, 970*b*, for example, to access and render content pages, such as web pages or other network content served up by the computing device 910 and/or other servers. The content access application may be executed to obtain and render for display content features from the server or computing device 910, or other services and/or local storage media.

In some embodiments, the content access application 980 may correspond to code that is executed in the browser 975 or plug-ins to the browser 975. In other embodiments, the content access application 980 may correspond to a stand-alone application, such as a mobile application. The client device 970*a*, 970*b* may be configured to execute applications beyond those mentioned above, such as, for example, mobile applications, email applications, instant message applications and/or other applications. Users at client devices 970*a*, 970*b* may access content features through content display devices or through content access applications 980 executed in the client devices 970*a*, 970*b*.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is implemented in a server, a hosted computing environment, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Some features of the system will now be described. One feature of the present disclosure includes presentation by the system of a room or other virtual environment with an electronic representation of the physical art superimposed therein, along with additional options such as a frame around the electronic representation of the physical art, virtual objects (such as furniture) and so forth. Another advantageous feature is indicating scale of the physical art with respect to other objects and the room, as represented in the virtual environment. For example, customers can view the electronic representation of the physical art in virtual environments scaled according to physical counterpart sizes, and the scale may be available to the customers to evaluate art sizes.

The system may also enable customers to change the virtual environments into which the electronic representations of physical art are superimposed via a user interface. For examples, virtual environments such as rooms may be sized to different scales or zoom levels to accommodate different electronic representations of the physical art or different sizes of electronic representations of the physical art. Dimensions may be displayed within the virtual environment, the electronic representation of the physical art, and/or any other virtual objects in the virtual environment to indicate a true relative scale.

In one aspect, the virtual environments may be computer-generated environments. However, some examples may implement digital photographs of real rooms rather than theoretical or contrived environments. In another example, multiple photographs may be stitched together to form a room. The system may enable customers or sellers to upload custom virtual environment views or to customize virtual environments, such as by changing the color of virtual objects in the environment or adding virtual objects to the environment. For example, a wall color may be changed from a solid color to a patterned color (such as may be available through the use of wallpaper, stenciling or the like), or from a current shade or hue to another shade or hue. In other example, a customer may upload or provide a link to the computing device(s) 910 of an image of a physical object he or she already owns or is interested in acquiring (e.g., a couch), so that the computing device(s) 910 can include a virtual representation of the physical object in the virtual environment. The customer can then envision how the physical art would appear amidst his or her current or desired belongings.

The system may enable users to add a frame to displayed electronic representations of physical art. For example, the customer may be permitted to view the electronic representation of the physical art with and without a frame and to switch between multiple different frames sized or scaled to fit the displayed size of the physical art. The customer may further be enabled to configure the frame via a user interface, such as by selecting a finish, paint color and so forth. In the example described above where a customer views the electronic representation of the physical art in a captured image of the customer's room, whether as a live image or stored image, the electronic representation of the physical art and an optional frame may be displayed to scale, with the frame being swappable or customizable as described. The frames may be photographic images of frames or modeled and rendered frames.

The virtual environment may be customizable using a number of different settings. For example, customers or sellers may modify lighting conditions (e.g., type of lighting, color balance of lighting, lighting intensity, lighting direction, etc.), the angle at which the work is mounted relative to a viewing angle, the colors and styling of the wall around the electronic representation of the physical art, the type of glass or plastic used to contain the electronic representation of the physical art and so forth. A well-tuned environment may closely approximate a real room or showroom to enable the customer to best experience the physical art virtually without actually being in the presence of the physical art.

Sellers may be asked to provide the dimensions of the physical art in order for the virtual environment feature to show proper scale. For framed physical art, sellers may provide images of the framed physical art or images of the frames and the physical art separately.

When a customer is viewing the electronic representation of the physical art in the virtual environment and the physical art is available in multiple sizes, the customer may view a different size of the physical art in the virtual environment without reloading the content page or without reloading various portions of the virtual environment. Selection of different options from the information box may allow the customers to change what size of the physical art appears electronically represented in the virtual environment view.

Sizing or scaling of the virtual environment or electronic representation of the physical art by the system may depend on whether or not the physical art is framed. For example, if the physical art is framed, the framed dimensions may be used for scaling. If the physical art is unframed, the unframed dimensions may be used for scaling. If multiple sizes of the physical art are listed as available and the seller has not indicated whether one or more of the available sizes includes framed sizes, the system may analyze electronic representations of the physical art and/or compare the electronic representations of the physical art against one another to determine whether an identifiable border exists around one or more of the available electronic representations of the physical art. As another alternative, if the physical art is known to be available in a standard size and the size or dimensions of the available physical art is not a standard size or is between standard sizes, an assumption may be made that the physical art is framed. As yet another alternative, when comparing multiple available physical art sizes against one another, if a difference in size is within a predetermined size range and the difference is such that it is not likely to be a difference between one standard size and another, then a determination may be made that the larger of the sizes is likely framed.

The system may also provide recommendations of physical art to users to view in the virtual environment as potential purchases. For example, recommendations such as "customers who viewed this work also viewed . . . " may be provided. Accordingly recommendations may be tailored by the system to individual customers. Machine learning may be used by the system to enhance recommendations and image-based searches.

Figure 10:
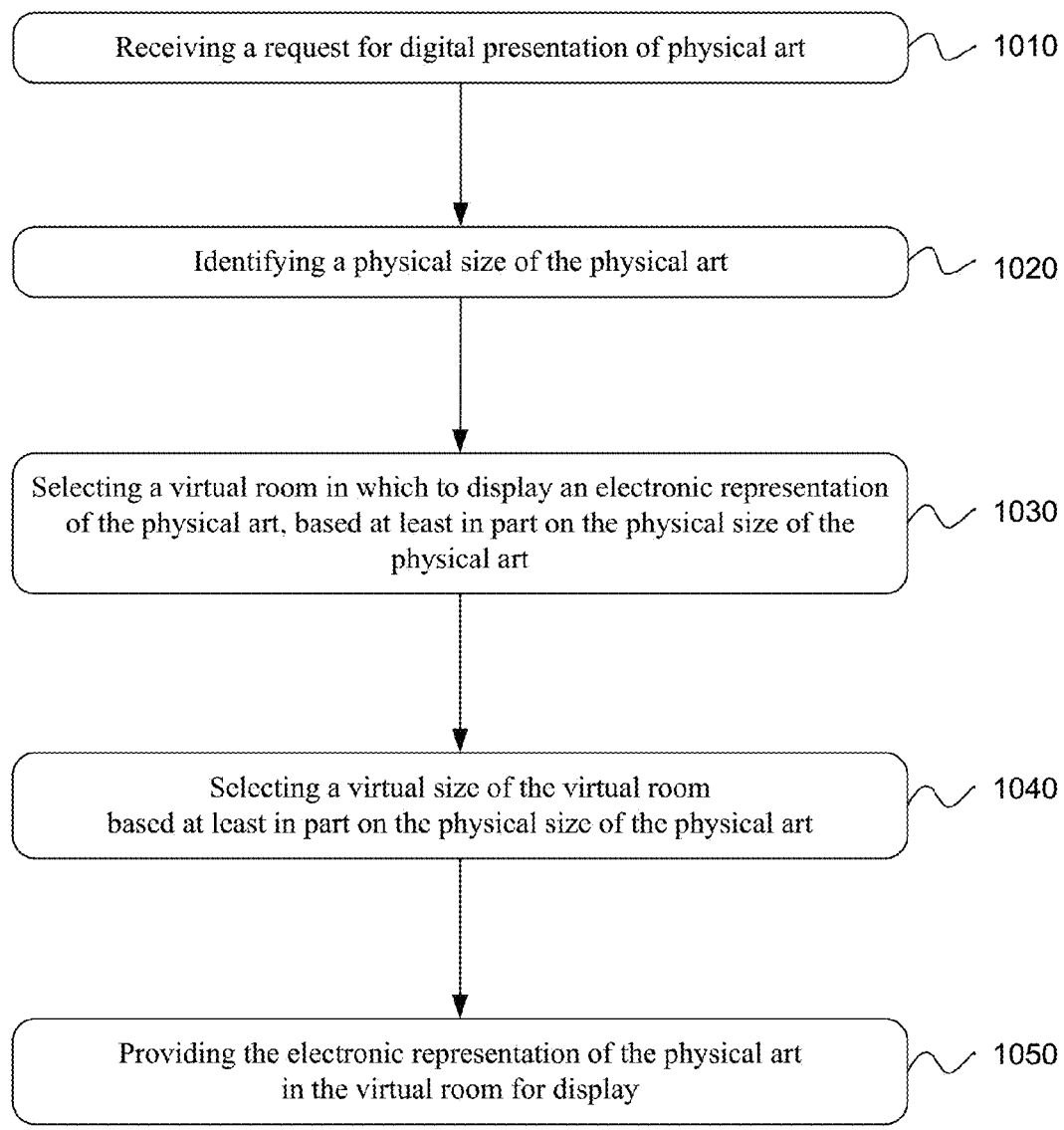
FIG. 10 is a flowchart illustrating a method of displaying art in accordance with an example of the present technology.

Referring now to FIG. 10, a flow diagram of an illustrative method for electronically presenting physical art is depicted. The method may be include receiving 1010 a request at a computing device, such as computing device 910, for presentation or display of an electronic representation of physical art from a client device, such as client device 970a. In response to the request, a size of the physical art may be identified 1020 by the computing device 910. A virtual environment may be selected 1030 by the computing device 910 in which to display an electronic representation of the physical art based at least in part on the size of the physical art. The method may include selecting 1040, using the computing device 910, a virtual size of the virtual environment based at least in part on the size of the physical art, and the electronic representation of the physical art may be provided 1050 in the virtual environment for display to the client device.

The method may further include modifying the virtual environment, using the computing device 910, by changing a number or positioning of virtual objects included for display with the electronic representation of the physical art in the virtual environment. Other modifications may include modifying colors or styles of virtual objects, such as furniture, decorations, and so forth. In one aspect, a virtual size of the virtual environment may be selected by selecting a pre-sized virtual environment from among a plurality of differently pre-sized virtual environments, or rather from virtual environments having different pre-determined virtual sizes. The selection may be based, for example, on a largest available size of the physical art.

In one example, the method may use the computing device 910 to modify a scale at which the virtual environment is displayed. In one implementation, the scale may be modified by increasing a scale of the virtual environment and a displayed size of virtual objects in the virtual environment relative to an available display screen size of the client device when the size of the physical art is smaller than a predetermined threshold.

In one example, the method may use the computing device 910 to select a frame for use with the electronic representation of the physical art based on a size or other characteristic of the physical art, the electronic representation of the physical art or the virtual environment. In a reverse example, the electronic representation of the physical art or the virtual environment may be selected or configured based on a selection of a frame in which to display electronic representations of the physical art. For example, a customer may be interested in purchasing a frame for the physical art and may choose to view an electronic representation of the frame in a virtual environment with the electronic representation of the physical art presented within the electronic representation of the frame to get a sense for how the frame would look in the customer's room or other selected physical environment. A size, color, style, shape, or other characteristic of the frame may be used to select or configure the electronic representation of the physical art to be inserted into the electronic representation of the frame or the virtual environment in which to display the electronic representation of the frame.

Figure 11:
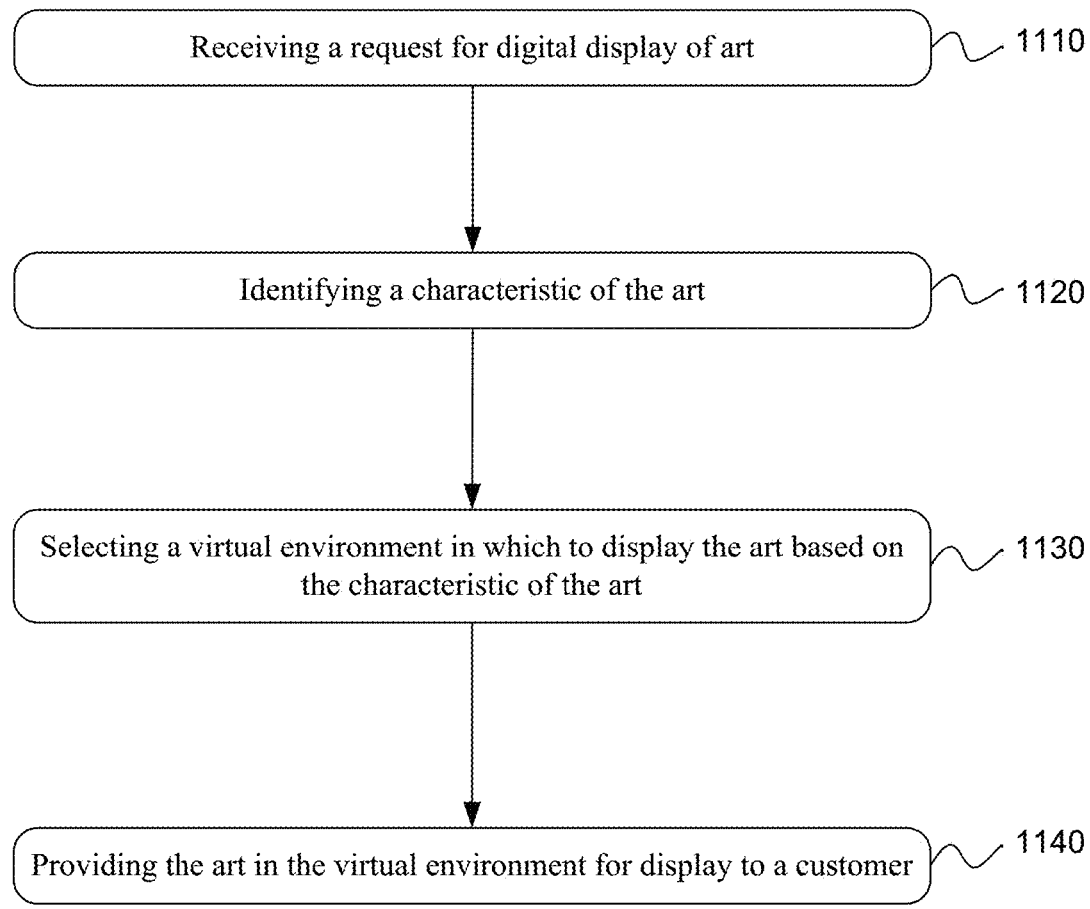
FIG. 11 is a flowchart illustrating a method of providing art for display in accordance with an example of the present technology.

Referring now to FIG. 11, a flow diagram of an illustrative method for electronically displaying physical art is depicted. The method may include receiving 1110 a request at a computing device 910 or server for electronic display of physical art and identifying 1120 a characteristic of the physical art, such as a size or color, for example. A virtual environment in which to display an electronic representation of the physical art may be selected 1130 by the computing device 910 at least in part based on the characteristic of the physical art. The method may include providing 1140 the electronic representation of the physical art in the virtual environment for to a client device, such as client device 970a, for display to a customer. The method may include providing an option to purchase the physical art subject of the electronic representation, as well as physical embodiments (e.g., furniture, accessories, etc.) of the virtual objects in the virtual environment.

The method may use the computing device 910 to modify a selected virtual environment based on the size of the physical art, such as by: changing a number or positioning of virtual objects included for display with the electronic representation of the physical art in the virtual environment; selecting the virtual environment from a plurality of available virtual environments having different sizes based on a largest available size of the physical art; modifying a scale at which the virtual environment is displayed by increasing a displayed size of virtual objects in the virtual environment relative to an available display screen size when the size of the physical art is smaller than a predetermined threshold; and so forth.

The method may further use the computing device 910 to provide virtual objects for inclusion with display of the virtual environment in order to provide relative scale for the electronic representation of the physical art. Such display may also include indicators of dimension in the virtual environment. The dimension or scale may indicate a physical size dimension. In addition, a number of pixels in the virtual environment may be used to represent a unit of the dimension. A number of pixels for displaying the virtual objects based on physical size dimension units of corresponding physical objects may be calculated, as well as a number of pixels for displaying the electronic representation of the physical art based on the physical size dimension units of the physical art. The electronic representation of the physical art may thus be provided in the virtual environment for display together with the virtual objects, where the size or scaling of the virtual environment, virtual objects, electronic representation of the physical art, etc. may be based on the physical size dimension units of the corresponding physical objects and the physical art.

In one example, the method may include determining whether the size of the physical art includes a frame around the physical art, and selecting the virtual environment in which to display the electronic representation of the physical art based in part on the size of the physical art with the frame.

The method, using the computing device 910, may further include providing a purchase option to a client device 970a for display to a customer that includes an option to purchase physical objects represented in the virtual environment other than the physical art. The option may also include information about the objects from an item data store and/or links to detail pages about the objects.

Figure 12:
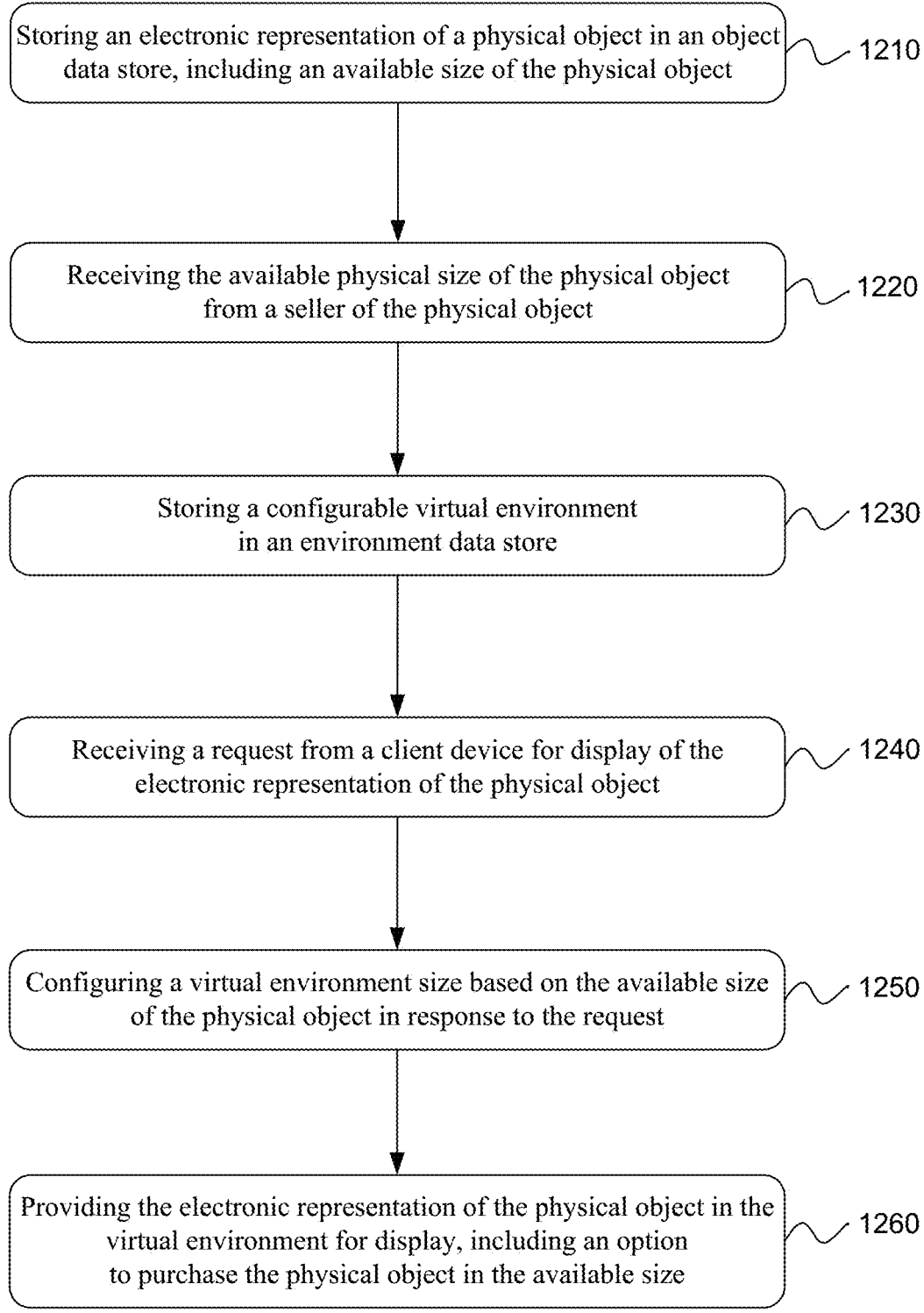
FIG. 12 is a flowchart illustrating a method of selling art in accordance with an example of the present technology.

Referring to FIG. 12, a flow diagram of an illustrative method for selling physical objects, such as physical art for example, is depicted. The method, using the computing device 910, may include storing 1210 an electronic representation of physical object in a data store, such as data store 915, including an available size of the physical object. The available size of the physical object may be received 1220 at a computing device 910 from a seller of the physical object. A configurable virtual environment may be stored 1230 in the data store 915. The method may include receiving 1240 a request at the computing device 910 from a client device for display of the electronic representation of the physical object, and configuring 1250 a virtual environment size using the computing device 910 based on the available size of the physical object in response to the request. Configuration of the virtual environment may include, for example, scaling the electronic representation of the physical object to a corresponding virtual scale of the virtual environment. The electronic representation of the physical object in the virtual environment may be provided 1260 to a client device 910a for display to a customer, which display may include an option to purchase the physical object in the available size.

In addition, dimensions of the available size may also be displayed when a specified user interaction with respect to the virtual environment or the electronic representation of the physical object is received via the client device. For example, the user may type, tap, speak, gesture or perform any other suitable interaction predefined to result in display of the dimensions. In another example, the customer may be restricted from downloading the electronic representation of the physical object, the virtual environment, or any other virtual objects included in the virtual environment as indicators of scale of the object or the electronic representation of the physical art.

In one example where the physical object is physical art, the customer may capture an image of a room using client device 970b. An electronic representation of the physical art in which the customer is interested may then be presented as an overlay on the captured image. In another embodiment, rather than present the electronic representation of the physical object over the captured image on the display 985 of the client device 970b, the electronic representation of the physical object is provided for display via a projector. To ensure properly sized/scaled display of the electronic representation of the physical object via projector, a size of the electronic representation of the physical object displayed may be based on detected a distance between a wall and the projector. Any number of known techniques for estimating a distance from an imaging device may be used such as infrared, laser or other measurement techniques.

In some examples, this or other methods described herein may be implemented wholly or partially as computer readable program code executed by a processor and the computer readable code may be embodied on a non-transitory computer-readable medium.

Figure 13:
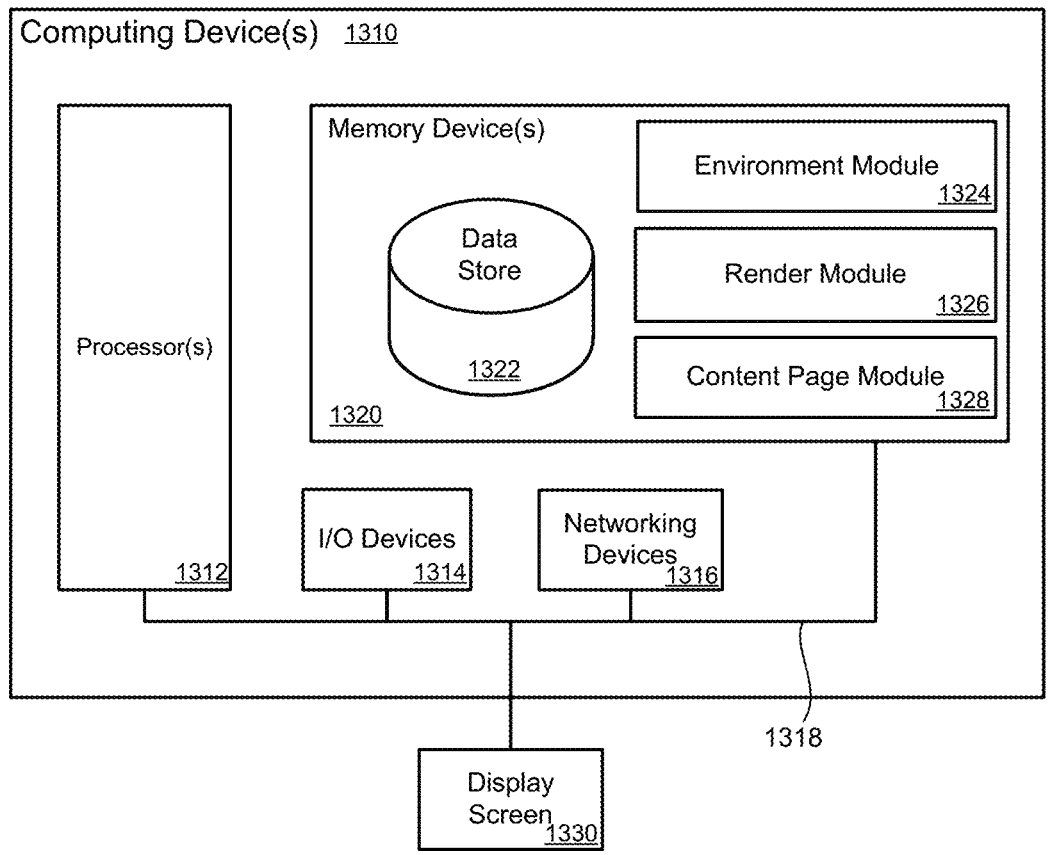
FIG. 13 is a block diagram illustrating an example of a computing device for displaying art in accordance with an example of the present technology.

FIG. 13 illustrates a computing device 1310 on which modules of this technology may execute. A computing device 1310 is illustrated on which a high level example of the technology may be executed. The computing device 1310 may include one or more processors 1312 that are in communication with memory devices 1320. The computing device 1310 may include a local communication interface 1318 for the components in the computing device. For example, the local communication interface 1318 may be a local data bus and/or any related address or control busses as may be desired.

The memory device 1320 may contain modules that are executable by the processor(s) and data for the modules. Located in the memory device 1320 are modules executable by the processor. For example, an environment module 1324, a render module 1326, and a content page module 1328, as well as other modules, may be located in the memory device 1320. A data store 1322 may also be located in the memory device 1320 for storing data related to the modules and other applications along with an operating system that is executable by the processor(s) 1312.

The computing system 1310 of FIG. 13 may be utilized for displaying electronic representations of physical art and for selling physical art. For example, the environment module 1324 may provide an environment in which to display the electronic representations of the physical art. The render module 1326 may render the electronic representations of the physical art and the environment at a scale, such as based on a size of the physical art. The content page module 1328 may provide a content page for display, which may include the rendered environment containing the electronic representation of the physical art, as well as any other suitable information, such as physical art details, purchasing options and so forth, for example.

The computing device 1310 may further include or be in communication with a client device 1330, which may include a display device. The client device 1330 may be available for an administrator to use in interfacing with the computing device 1310, such as to review operation of the system, make improvements to the system and so forth.

Various applications may be stored in the memory device 1320 and may be executable by the processor(s) 1312. Components or modules discussed in this description that may be implemented in the form of software using high programming level languages that are compiled, interpreted or executed using a hybrid of the methods.

The computing device 1310 may also have access to I/O (input/output) devices 1314 that are usable by the computing devices. An example of an I/O device 1314 is a display screen that is available to display output from the computing devices. Other known I/O device may be used with the computing device as desired. Networking devices 1316 and similar communication devices may be included in the computing device 1310. The networking devices 1316 may be wired or wireless networking devices 1316 that connect to the internet, a LAN, WAN, or other computing network.

The components or modules that are shown as being stored in the memory device 1320 may be executed by the processor 1312. The term "executable" may mean a program file that is in a form that may be executed by a processor 1312. For example, a program in a higher level language may be compiled into machine code in a format that may be loaded into a random access portion of the memory device 1320 and executed by the processor 1312, or source code may be loaded by another executable program and interpreted to generate instructions in a random access portion of the memory to be executed by a processor 1312. The executable program may be stored in any portion or component of the memory device 1320. For example, the memory device 1320 may be random access memory (RAM), read only memory (ROM), flash memory, a solid state drive, memory card, a hard drive, optical disk, floppy disk, magnetic tape, or any other memory components.

The processor 1312 may represent multiple processors and the memory 1320 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, include one or more blocks of computer instructions, which may be organized as an object, procedure, or function. Nevertheless, the executables of an identified module need not be physically located together, but may include disparate instructions stored in different locations that include the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a non-transitory computer readable storage medium that includes volatile and non-volatile, removable and non-removable media implemented with any technology for the storage of information such as computer readable instructions, data structures, program modules, or other data. Non-transitory computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium that may be used to store the desired information and described technology. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the present disclosure.

The invention claimed is:

1. A computer-implemented method comprising:
under control of a computing device configured with specific, computer-executable instructions,
receiving a request for an electronic representation of physical art;
identifying a size of the physical art;
automatically selecting via the computing device, based at least in part on the size of the physical art, a virtual room having a size including a height of a wall selected for displaying the electronic representation of the physical art in the virtual room;
scaling aspects within the virtual room based in part on the size of the physical art;
providing instructions for rendering a user interface that presents at least (i) the virtual room including the electronic representation of the physical art, wherein the electronic representation of physical art is either rendered in the virtual room according to a set of positioning rules or, if there is a conflict between the set of positioning rules, the electronic representation of the physical art is rendered in the virtual room according to a conflict rule that defines how to render the electronic representation of the physical art in an event of a conflict of the set of positioning rules, and (ii) an option to purchase the physical art; and
receiving an indication that the option to purchase the physical art has been selected.

2. The computer-implemented method of claim 1, wherein the virtual room includes one or more virtual furniture objects, and the computer-implemented method further comprises changing a number or position of the one or more virtual furniture objects in the virtual room based at least in part on the size of the physical art.

3. The computer-implemented method of claim 1, further comprising selecting the virtual room from a plurality of virtual rooms based at least in part on a largest available size of the physical art, wherein each of the plurality of virtual rooms has a different pre-determined virtual size.

4. The computer-implemented method of claim 1, further comprising modifying a scale at which the virtual room is presented in the user interface relative to a physical size of a computing device display based at least in part on the size of the physical art.

5. A computer-implemented method comprising:
under control of a computing device configured with specific, computer-executable instructions,
identifying a characteristic of physical art;
automatically selecting via the computing device a virtual environment in which to include an electronic representation of the physical art based at least in part on the characteristic of the physical art, the virtual environment having a size including a height of a wall selected based at least in part on an actual size of the physical art;
scaling aspects within the virtual environment based in part on the actual size of the physical art; and
causing the virtual environment in which the electronic representation of the physical art is included to be displayed in a user interface, wherein the electronic representation of physical art is either displayed in the virtual environment according to a set of positioning rules or, if there is a conflict between the set of positioning rules, the electronic representation of the physical art is rendered in the virtual environment according to a conflict rule that defines how to display the electronic representation of the physical art in an event of a conflict of the set of positioning rules.

6. The computer-implemented method of claim 5, wherein the characteristic of the physical art comprises at least one of: a color of the physical art, inclusion of a frame around the physical art, a frame type, a frame size, a buyer preference, a seller preference, or an art category.

7. The computer-implemented method of claim 5, further comprising modifying a selected virtual environment based at least in part on the size of the physical art, wherein modifying comprises at least one of:
changing a number or positioning of virtual objects included for display with the electronic representation of the physical art in the virtual environment;
selecting the virtual environment from a plurality of available virtual environments having different sizes based at least in part on a largest available size of the physical art; or
modifying a scale at which the virtual environment is displayed by increasing a displayed size of virtual objects in the virtual environment relative to an available display screen size when the size of the physical art is smaller than a predetermined threshold.

8. The computer-implemented method of claim 5, wherein the virtual environment includes a virtual object to provide relative scale for the physical art, and the virtual environment includes an indicator of dimension.

9. The computer-implemented method of claim 8, wherein the dimension is a physical size dimension, the computer-implemented method further comprising:
identifying a number of pixels in the virtual environment used to represent a unit of the dimension;
calculating a number of pixels for displaying the virtual object based at least in part on physical size dimension units of a physical object corresponding to the virtual object;
calculating a number of pixels for displaying the electronic representation of the physical art based at least in part on the physical size dimension units of the physical art; and
providing the electronic representation of the physical art in the virtual environment for display based at least in part on the physical size dimension units of the physical object and the physical art.

10. The computer-implemented method of claim 5, further comprising selecting the virtual environment from a plurality of virtual environments based at least in part on a largest available size of the physical art, wherein each of the plurality of virtual environments has a different pre-determined virtual size.

11. The computer-implemented method of claim 5, further comprising providing an option to purchase at least one of the physical art or a physical object corresponding to a virtual object in the virtual environment.

12. The computer-implemented method of claim 11, wherein the virtual environment includes information about the virtual object from an item data store and a link to a network page including data about the virtual object.

13. The computer-implemented method of claim 5, further comprising selecting a different center position of the electronic representation of the physical art in the virtual environment for different sizes of the physical art.

14. A computer-implemented method, comprising:
storing an electronic representation of physical art and an available size of the physical art;
receiving a request from another computing device to view the electronic representation of the physical art;
automatically generating a virtual environment having a size including a height of a wall selected for displaying the electronic representation of the physical art in the virtual environment based at least in part on the available size of the physical art;
scaling aspects within the virtual environment based in part on the available size of the physical art; and
causing the virtual environment to be displayed at the another computing device via a user interface with an option to purchase the physical art, the virtual environment including the electronic representation of the physical art, wherein the electronic representation of physical art is either displayed in the virtual environment according to a set of positioning rules or, if there is a conflict between the set of positioning rules, the electronic representation of the physical art is rendered in the virtual environment according to a conflict rule that defines how to display the electronic representation of the physical art in an event of a conflict of the set of positioning rules.

15. The computer-implemented method of claim 14, the method further comprising scaling the virtual environment according to the electronic representation of the physical art.

16. The computer-implemented method of claim 15, the method further comprising displaying an indication of scale in the virtual environment.

17. The computer-implemented method of claim 14, the method further comprising positioning the electronic representation of the physical art in the virtual environment based at least in part on the available size of the physical art.

18. The computer-implemented method of claim 14, the method further comprising: modifying a scale of the virtual environment, modifying a number or placement of objects in the virtual environment, or selecting from one of a plurality of available virtual environments.

19. The computer-implemented method of claim 14, the method further comprising centering the electronic representation of the physical art relative to a user interface size.

20. The computer-implemented method of claim 14, wherein the virtual environment is an image of a physical environment, the method further comprising causing the electronic representation of the physical art to be presented as an overlay on the image of the physical environment.

21. The computer-implemented method of claim 20, further comprising receiving the image of the physical environment from the another computing device.

22. A non-transitory machine readable storage medium, including executable program instructions that, when executed by a computer system, configures the computer system to perform operations comprising:
storing an electronic representation of a physical object and an available size of the physical object, wherein the available size of the physical object is received from a provider of the physical object;
storing a configurable virtual environment;
receiving a request for display of the electronic representation of the physical object;
in response to receiving the request, automatically configuring via the computer system, a virtual environment having a size including a height of a wall for displaying the electronic representation of the physical object in the virtual environment based at least in part on the available size of the physical object, wherein configuring the virtual environment size includes scaling a size of the virtual environment for a user interface and scaling the electronic representation of the physical object to a corresponding virtual scale of the virtual environment based at least in part on the available size of the physical object;

scaling aspects within the virtual environment based in part on the available size of the physical object; and generating instructions for rendering the user interface that presents the electronic representation of the physical object in the virtual environment, wherein the electronic representation of physical art is either rendered in the virtual environment according to a set of positioning rules or, if there is a conflict between the set of positioning rules, the electronic representation of the physical art is rendered in the virtual environment according to a conflict rule that defines how to render the electronic representation of the physical art in an event of a conflict of the set of positioning rules, and presents an option to purchase the physical object in the available size.

23. The machine readable storage medium of claim 22, wherein the user interface includes a dimension of the available size of the physical object.

24. The machine readable storage medium of claim 22, wherein the virtual environment is a flat surface, and the instructions for rendering the user interface include instructions for rendering the user interface on the flat surface via a projector.

* * * * *